United States Patent
Wilde et al.

(10) Patent No.: US 6,880,759 B2
(45) Date of Patent: Apr. 19, 2005

(54) OPTICAL READER STATION

(75) Inventors: Christopher D. Wilde, Nepean (CA); Ufuk Orhun, Nepean (CA); Essam Bakr, Kanata (CA); Harold L. Page, Almonte (CA)

(73) Assignee: Symagery Microsystems Inc., Kanata (CA)

( * ) Notice: Subject to any disclaimer, the term of this patent is extended or adjusted under 35 U.S.C. 154(b) by 0 days.

(21) Appl. No.: 10/444,406

(22) Filed: May 23, 2003

(65) Prior Publication Data

US 2004/0232236 A1 Nov. 25, 2004

(51) Int. Cl.⁷ .................................................. G06K 7/10
(52) U.S. Cl. .................................................. 235/462.31
(58) Field of Search .................................. 235/462.31

(56) References Cited

U.S. PATENT DOCUMENTS

| | | | |
|---|---|---|---|
| 4,095,091 A | * 6/1978 | Nakano | 235/472.01 |
| 4,766,297 A | 8/1988 | McMillan | |
| 4,789,775 A | * 12/1988 | McClain et al. | 235/462.31 |
| 5,039,847 A | 8/1991 | Morii et al. | 235/379 |
| 5,155,345 A | * 10/1992 | Ito | 235/462.31 |
| 5,237,161 A | * 8/1993 | Grodevant | 235/462.31 |
| 5,256,865 A | 10/1993 | Wike, Jr. et al. | |
| 5,343,028 A | 8/1994 | Figarella et al. | 235/462 |
| 5,550,366 A | 8/1996 | Roustaei | 235/462 |
| 5,557,091 A | 9/1996 | Krummel | 235/462 |
| 5,754,670 A | 5/1998 | Shin et al. | 382/56 |
| 5,808,286 A | 9/1998 | Nukui et al. | |
| 5,949,052 A | 9/1999 | Longacre et al. | 235/462.08 |
| 6,061,086 A | 5/2000 | Reimer et al. | 348/125 |
| 6,298,175 B1 | 10/2001 | Longacre et al. | 382/312 |

FOREIGN PATENT DOCUMENTS

| EP | 0 541 292 A2 | 4/1993 | |
|---|---|---|---|
| EP | 0 689 173 A2 | 5/1995 | G07G/1/00 |
| EP | 0 910 033 A2 | 4/1999 | |

* cited by examiner

*Primary Examiner*—Mark Tremblay
(74) *Attorney, Agent, or Firm*—Pearne & Gordon LLP

(57) ABSTRACT

The invention is directed to an optical reader station for reading an object and a method of controlling an illumination source in the station for illuminating the object. The optical reader station comprises a mount for an optical reader and a stand with a surface for receiving the object, the optical reader includes an imager with an object field of view in which the object to be read is positioned. The station further includes a radiation source positioned within the object field of view and arranged to be obstructed by the object when the object is in position to be read. A detection mechanism, which is positioned to receive radiation from the radiation source when the radiation source is not obstructed by the object, deactivates the illumination source when radiation source radiation is detected. The detector mechanism may form part of an auto-exposure control in the imager, which senses ambient light impinging on the imager including the radiation from the radiation source for controlling the illumination level of the illumination source, or it may be a separate detector, which senses the radiation from the radiation source for deactivating the illumination source. The radiation source, which may be an infrared source, a visible light source, a UV source or a luminescence emitter activated by a UV source, may be mounted within the surface of the stand.

27 Claims, 10 Drawing Sheets

OPTICAL READER STATION

FIELD OF THE INVENTION

The invention relates generally to optical reader stations and more particularly to unobtrusive optical reader stations, with minimal user interaction, low latency, and low energy use.

BACKGROUND OF THE INVENTION

Optical reader stations for scanning symbols have applications such as inventory control, parcel tracking, identification and security, i.e. wherever an electronic database may be maintained against a set of tangible elements. In such a station, the symbology reader performs the necessary function of converting the tangible information into electronic information.

Scanners in the optical reader stations may be handheld, permanently mounted, or they may consist of handheld scanners with a complementary mount for use in presentation mode scanning. In particular situations such as grocery checkouts or identification queues, a scanner is preferably a fixed mount or in a presentation mode of operation. In general, it is desirable that such stations draw low power, operate under low component stress, are simple and cost-effective to manufacture, are unobtrusive in their deployment, and are retrofitable and make use of existing system resources when improvements are considered.

Each symbology reader has imaging and decoding functions. The imaging function acquires an image of a coded object and converts the optical image information to corresponding electronic information. The decoding function extracts the encoded message from the electronic information.

The reader may also include other major functions where necessary or advantageous. For example a reader may include the functions of illuminating and/or targeting the symbol to be read. Variable illumination may be required to supply sufficient photonic radiation to capture a suitable image in varying ambient conditions. The required level of illumination on the object may be controlled by an auto-exposure function within the reader. A targeting system aids in positioning the symbol in the field of view.

Different strategies have been used during the development of readers. Some reader systems have inactive and active states, wherein they are activated to scan an object in response to an event, such as the pressing of a button, after which they return to their inactive state. The event that activates this type of reader might also be the detection of the absence or presence of a predetermined symbology in the object field by periodically scanning it. The absence of the predetermined symbology may signify that a valid object has been placed in the object field. Other types of readers are always active once they are switched on in that they continuously scan the object field and attempt to decode the imaged information without regard to the presence of a valid symbol within the field.

One method for controlling the active/inactive states of a reader is described in U.S. Pat. Ser. No. 5,949,052, which issued to Longacre, Jr. et al on Sep. 7, 1999. This disclosure is directed to the use of a special default symbol, the detection of which places the reader in an active state. This device may employ a predetermined pattern of backlighting on the surface where an object is to be placed. The backlighting lights a predetermined symbol from the back, which is scanned periodically and decoded by the reader. When the predetermined symbol is detected, the reader is placed in an inactive mode, when the predetermined symbol is not detected and the reader is placed in an active mode. When the predetermined symbol is not detected, it means that an object to be read is obstructing the line of sight from predetermined symbol to the reader, and the reader is activated to operate in its normal operating mode. Another form that the backlighting technique may take is described in U.S. Pat. Ser. No. 6,298,175, which issued to Longacre, Jr. et al on Oct. 2, 2001, wherein the backlighting emits light in a predetermined pattern such as being intermittently on and off, which is recognized by the reader. Although this solution provides benefits such as power saving, a station must be modified to include new apparatus and programming to both generate and recognize the predetermined symbol, or pattern. Another drawback is the latency introduced by this approach arising from the duration of switching to an active state. Increased latency lowers station productivity.

Existing continuous scan configurations do not adequately conserve power, and often operate with a constant or pulsed illumination source, which is found to be obtrusively non-ergonomic. In addition, the systems described above are not satisfactory solutions for existing event driven or continuous configurations. They do not provide a sufficiently simple low latency, cost-effective option that minimizes the use of new resources by maximizing the incorporation with existing reader resources, making it retrofittable in a simple manner.

Therefore, there is a need for improved unobstusive optical reader stations, with minimal user interaction, low latency and low energy use.

SUMMARY OF THE INVENTION

The invention is directed to an optical reader station for reading an object.

The optical reader station comprises an optical reader having an imager with an object field of view in which an object that is to be read is positioned and a source of illumination for illuminating the object to be read. The station further includes a radiation source positioned within the object field of view and arranged to be obstructed by the object when the object is positioned to be read. A detection mechanism is positioned to receive radiation from the radiation source when the radiation source is not obstructed by the object for deactivating the illumination source.

In accordance with another aspect of the invention, the detector mechanism comprises an auto-exposure control coupled to the imager for sensing the radiation and to the illumination source for controlling the deactivation of the illumination source.

In accordance with a further aspect of the invention, the optical reader station for reading an object comprises an optical reader having an imager with an object field of view in which an object is to be positioned to be read, a source of illumination for illuminating the object to be read, and an auto-exposure controller coupled to the imager to control the illumination source in response to radiation on the imager. The optical reader station further includes a radiation source positioned within the object field of view to direct radiation towards the imager, wherein the radiation source is arranged to be obstructed by the object when the object is positioned to be read and wherein the illumination source is deactivated when the radiation source is unobstructed by the object and radiation from the radiation source impinges on the imager.

With regard to a particular aspect of the invention, the optical reader station further includes a stand for mounting the radiation source and for receiving the object to be read, and a mounting mechanism connected to the stand for receiving the optical reader in a fixed or a detachable manner.

In accordance with another aspect of the invention, an optical reader station for reading an object comprises an optical reader mount having a stand with a surface for receiving the object to be read and an optical reader fixed to the mount. The optical reader includes an imager facing the stand, a source of illumination for illuminating the object on the stand, and an auto-exposure control coupled to the imager to control the illumination source in response to radiation on the imager. The optical reader station further includes a radiation source mounted on the stand facing the imager for directing radiation to the imager, whereby the source of illumination is adapted to be deactivated by the auto-exposure control when the imager receives radiation from the radiation source.

With regard to a particular aspect of the invention, the optical reader is detachably fixed to the mount.

In accordance with a further particular aspect of the invention, the radiation source is mounted within the surface of the stand.

In accordance with other aspects of the invention, the radiation source is an infrared source, a visible light source, a UV source or a luminescence emitter activated by a UV source.

With regard to another particular aspect of the invention, the illumination source is a target source or includes a target source.

In accordance with a further aspect, the invention is directed to a method for controlling an illumination source in an optical reader for reading an object having an imager and an illumination source for illuminating the object to be read. The method comprises detecting ambient light impinging on the imager, controlling the intensity of the illumination source in proportion to the level of ambient light detected by the imager when the object is in a position to be read, and directing constant radiation having a predetermined threshold level at the imager when the object is not in a position to be read.

In accordance with another aspect of the invention, method for controlling an illumination source in an optical reader for reading an object having an imager and an illumination source for illuminating the object to be read, comprises detecting ambient light impinging on the imager, controlling the intensity of the illumination source in proportion to the level of ambient light detected by the imager when the object is in a position to be read, directing radiation having a predetermined threshold level at a detector when the object is not in a position to be read, and disabling the illumination source in response to the radiation detected by the detector.

With regard to a particular aspect of the invention, the directed radiation is infrared, visible, UV or luminescent radiation.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein.

DETAILED DESCRIPTION OF THE INVENTION

Figure 1:
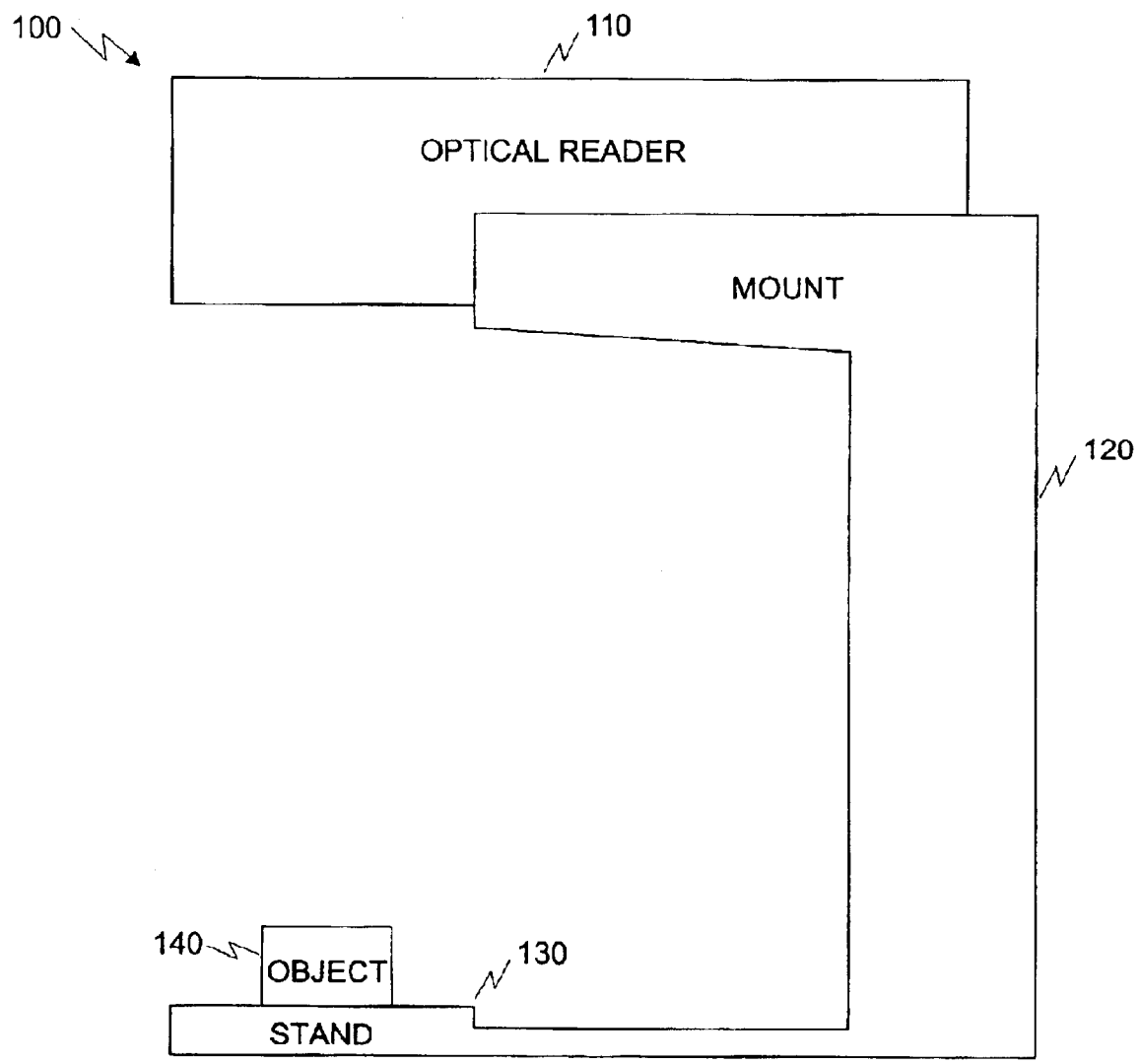
FIG. 1 is a schematic diagram of a prior art optical reader station.

FIG. 1 is a schematic diagram of a basic optical reader station 100. Station 100 includes an optical reader 110 and a mount 120 for receiving the optical reader. The mount 120 further includes a stand 130 on which an object 140 that is to be scanned is placed. The reader 110 may be permanently fixed to the mount 120, or alternatively the reader 110 may be a portable optical reader that attaches to the mount 120 in a temporary fashion. The optical reader 110 faces the stand 130, such that it can scan the object 140 placed on it.

Figure 2:
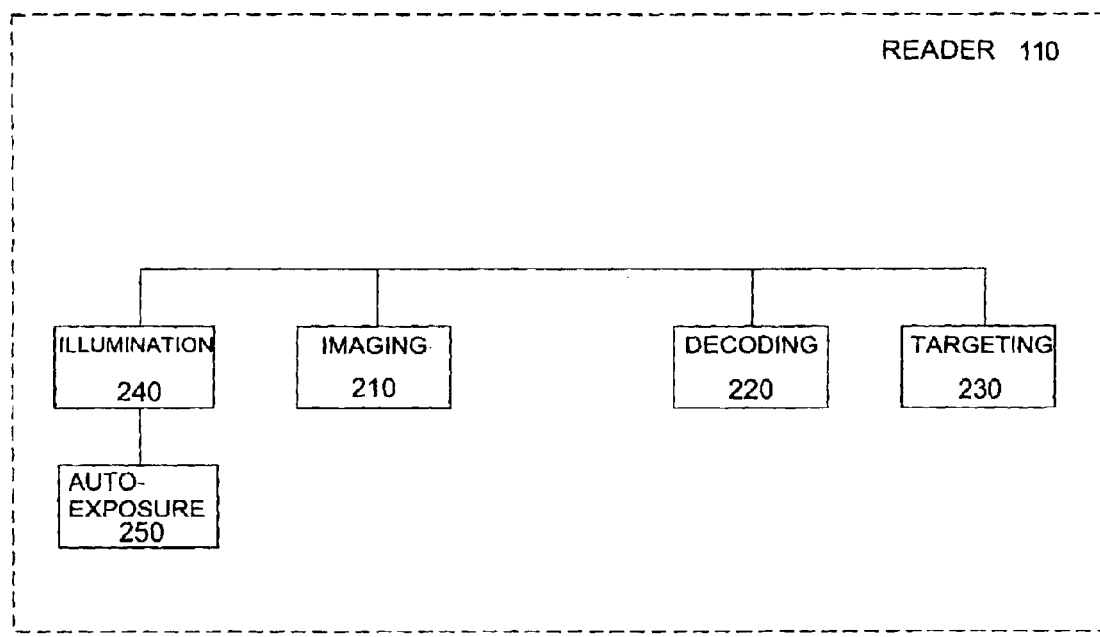
FIG. 2 is a functional block diagram of a prior art optical reader station.

Prior art optical readers 110 are capable of carrying out a number of functions when reading an object symbol 140, some of the functions are schematically illustrated in FIG. 2. A reader 110 includes the ability of imaging 210 the object symbol 140 that is placed on the stand 130 in the reader's object field of view and then decoding 220 the symbol 140 from the electronic information provided by the imaging function 210. The reader 110 may also include the functions of targeting 230 the object symbol 140 as well as illuminating 240 the object symbol 140 so that it can be properly imaged. The illumination 240 function may include an auto-exposure function 250, for controlling the level of illumination depending on the ambient light during the imaging process.

Imaging 210 is necessary to acquire an optical image of a coded object symbol 140 and to convert the optical image information to equivalent electronic information. Decoding 220 is necessary to extract the message encoded in the object symbol 140 from the equivalent electronic information. The illumination function 240 supplies sufficient photonic radiation to suitably capture the image of the object symbol 140, particularly through the use of auto-exposure 250, which maintains a desirable level of radiation on the object in varying ambient light conditions. Targeting 230 aids in positioning the object symbol 140 on the stand 130 so that it is within the reader's object field of view. All of the above functions may be utilized whether the optical reader 110 is operated in an event driven mode or in a continuous scan mode.

Figure 3:
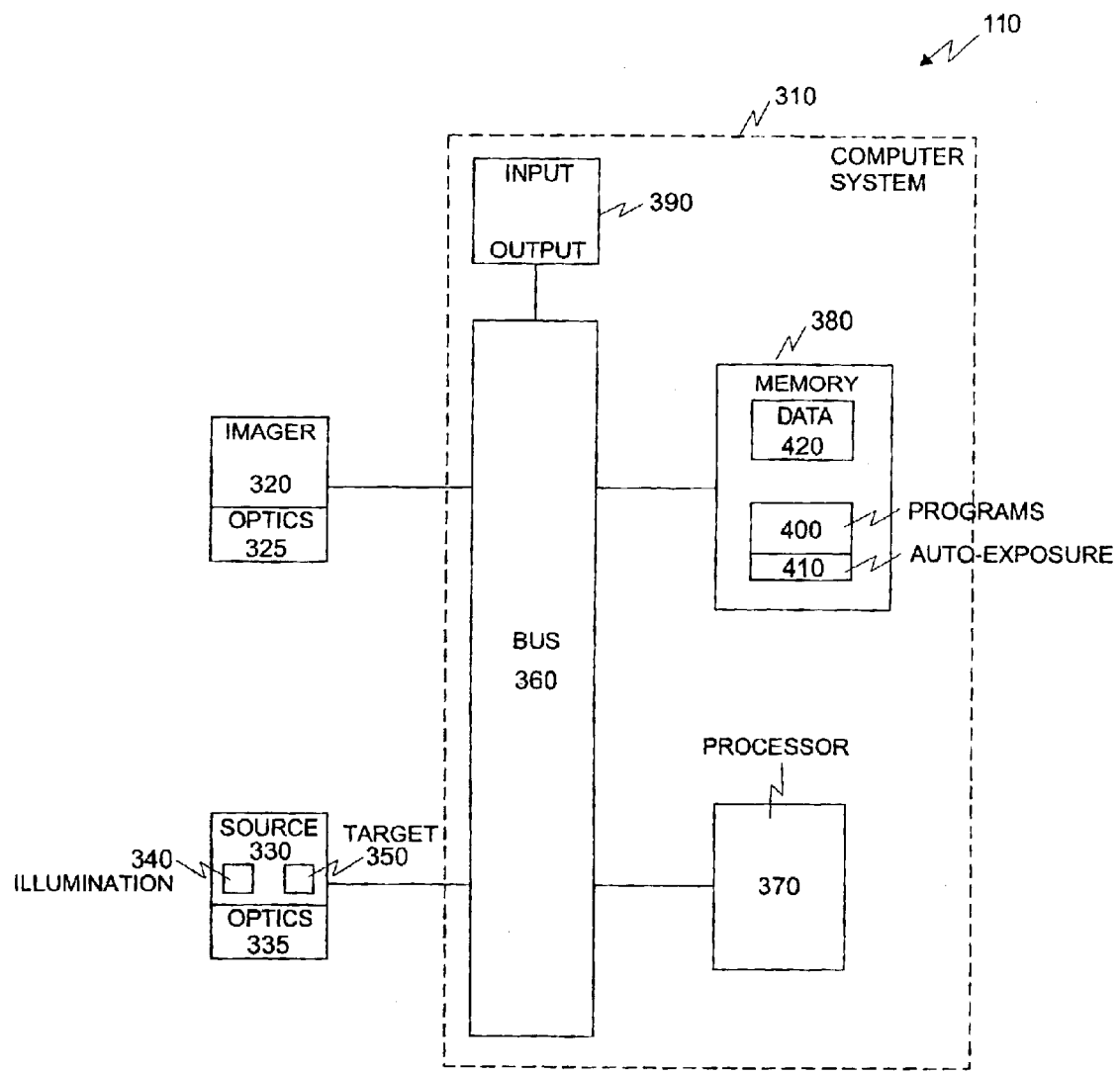
FIG. 3 is a block diagram of the prior art optical reader station.

A block diagram of the prior art optical reader 110 is shown in FIG. 3. The optical reader 110 includes a computer system 310, an imager 320, imager optics 325, incident optics 335, and incident radiation sources 330. The incident sources 330 include an illumination source 340 and may include a target source 350. The imager optics 325 focuses an object 140 to be scanned onto the imager 320. The incident optics 335 directs the light from the illumination source 340 onto the object 140 and may also direct a target source 350 marker onto the stand 130 to facilitate the placement of the object 140 in the object field of view for the imager 320.

The computer system 310 typically comprises a bus 360, processor 370, a memory 380, and an input/output interface 390. Memory 380 will store the operating programs 400 such as the imaging and decoding operating programs as well as the auto-exposure program 410 if required, and the data 420. The bus 360 interconnects the computer system 310 elements, along with imager 320 and incident sources 330. Note that the prior art also includes systems with independent program and data memories. For purposes of the invention described below, either is compatible. The single memory prior art is selected for illustration, and one skilled in the art will understand the trivial adaptation necessary to employ independant program/data memories.

Using the program or programs 400 stored in and retrieved from memory 380, the processor 370 operates the imager 320 and incident sources 330 according to good image acquisition practice, to acquire and decode the images of the object symbols 140, and to store the results in the data memory 420 and/or communicate them externally via the I/O interface 390.

In order to obtain satisfactory image acquisition in variable ambient light conditions, an auto-exposure function is highly desirable. In general, auto-exposure may affect exposure time, illumination and gain. Particularly interesting for the present invention, the auto-exposure function involves adjusting the illumination on the object symbol 140 to a suitable level by controlling the amount of light emanating from optical reader illumination source 340 in response to the overall amount of light detected by the imager 320 during a scan. Optical readers 110 of various types may use different measurements to control auto-exposure, for instance the response may be based on the average light detected over the entire imager 320 or over a portion of the imager. Typically the auto-exposure control includes the processor 370, in conjunction with an auto-exposure program 410, the imager 320 and the illumination source 340. In this arrangement the processor 370 responds to a sample or aggregation of the imager 320 output to control the activation of the illumination source 340. The source 340 usually has a range of brightness from a fully ON position to provide a brightness level necessary to scan an object 140 when there is no ambient light, to a fully OFF position when the ambient light is at or above a threshold level where there is sufficient light to scan the object 140.

Figure 4:
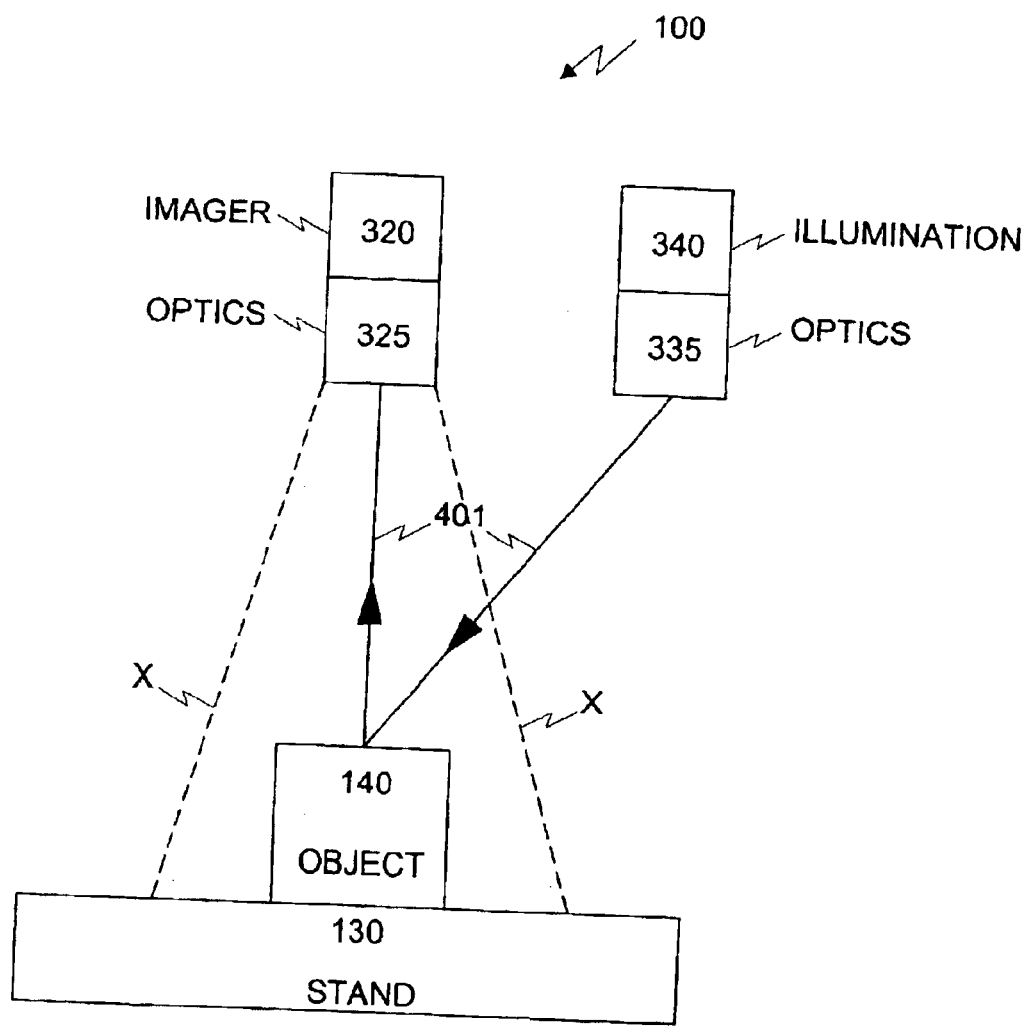
FIG. 4 is a schematic diagram of a portion of a prior art optical reader station using auto-exposure control.

FIG. 4, in a schematic diagram of a portion of the optical reader station 100, shows the radiation directed to the object 140 and reflected from the object 140 to the imager 320. The radiation travels along the path 401 from the illumination source 340 through the incident optics 335 to the surface of the object 140. This radiation is reflected from the object 140 and continues along the path 401 through the imager optics 325 to the imager 320. Depending on the imager optics 325, the optical reader station 100 will have an object field of view, represented by the broken lines X, within which the imager 320 will register an image of the object 140. The area that the imager 320 sees on the surface of the stand 130 is preferably only slightly bigger than the object 140 itself and may be rectangular, circular or any other desired shape as determined by the optics 325.

Figure 5:
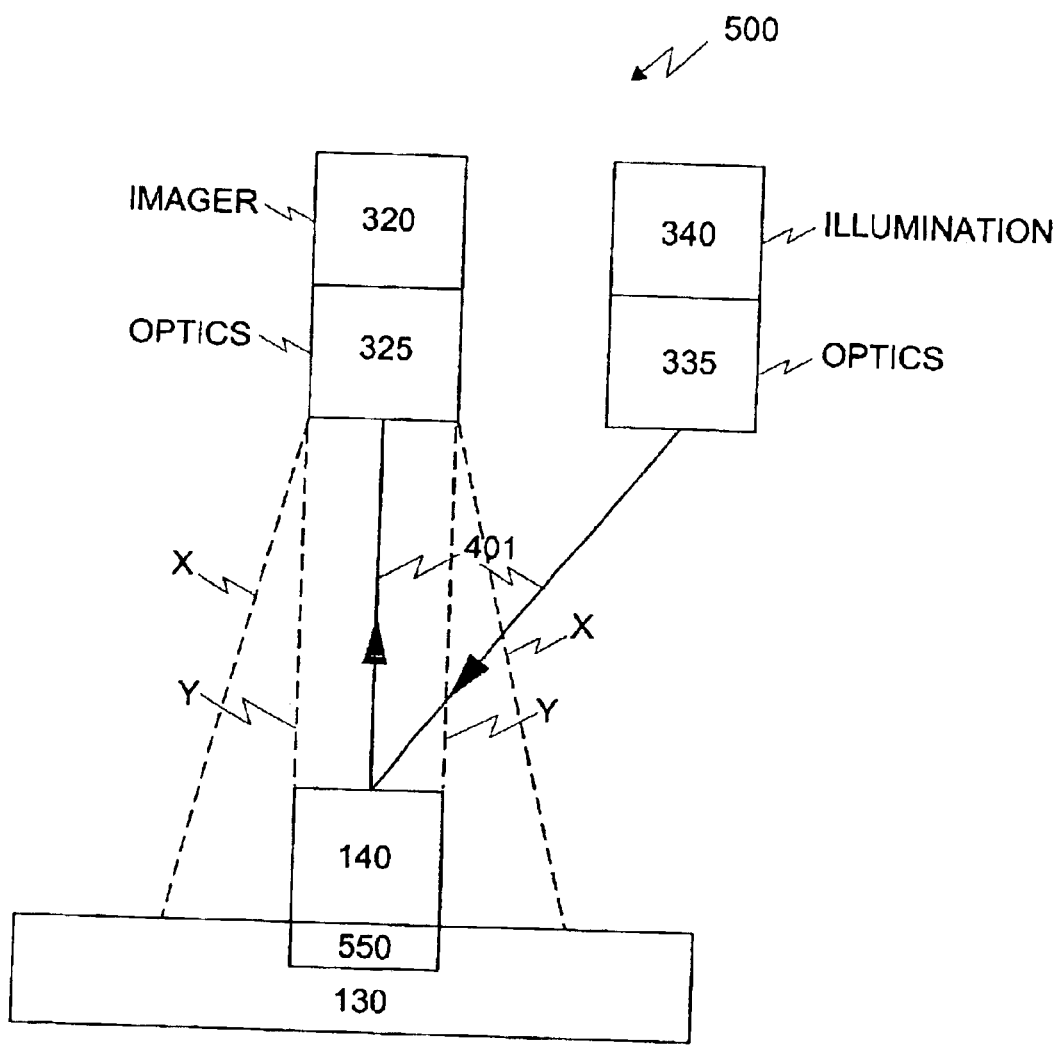
FIG. 5 is a schematic diagram of an embodiment of an optical reader station in accordance with the present invention having an infrared radiation source.

FIG. 5 is a schematic diagram of a portion of an optical reader station 500 in accordance with the present invention. For clarity and to simplify the description, elements in the optical reader station 500 which are similar to those in the optical reader station 100 in FIG. 4 carry the same reference numbers. The portion of the optical reader station 500 shown includes a stand 130 on which may be positioned the object 140 to be read, an imager 320 with its associated optics 325 as well as an illumination source 340 and its associated optics 335. The stand 130 is depicted independently from whatever work surface it may be placed on, but a work surface integrated embodiment is also envisioned. In addition, in accordance with the present invention the optical reader station 500 includes a source of radiation 550 mounted in the stand 130 at the location where an object 140 to be read is to be positioned. The radiation beam from the source 550 is directed to the imager 320 through the imager optics 325 and would preferably be confined to the space defined by broken lines Y, but need not be so. The cross-section of the radiation beam may be circular, rectangular or any other appropriate shape, however it is shaped and positioned such that, when an object 140 is placed at its appropriate position on the stand 130 for scanning, it will obscure the source 550 radiation from the imager 320. In order to direct the user to the field of view, the stand may be marked.

The radiation source 550 operates in conjunction with the auto-exposure control in the optical reader station 500 in the following manner. When an object 140 is not present within the object field of view as represented by broken lines X, the imager 320 will receive the radiation from the source 550 and the auto-exposure program will deactivate the illumination source 340. To accomplish this the source 550 must provide sufficient radiation to the imager 325 so that the auto-exposure control will see it as being at or over its threshold of required exposure level. Thus illumination source 340 will remain turned off until radiation source 550 is obstructed. When an object 140 is placed in the object field of view, the object 140 substantially obstructs the radiation source 550 beam defined by broken lines Y and the imager 320 is no longer exposed to the radiation from source 550. This will allow the over-exposure control to operate in the normal manner and set the illumination from the source 340 to a level required to properly image the object 140.

In the preferred embodiment of the present invention, the radiation source 550 is a source of infrared light. Typically, imager sensors 320, both CCD and CMOS, respond to infrared light as well as to visible light; the use of infrared light as the source 550 of continuous radiation is particularly advantageous in view of the size and the cost of infrared radiation sources as well as the fact that the infrared light source is much less obtrusive in situations where the level of the ambient light is low.

Figure 6:
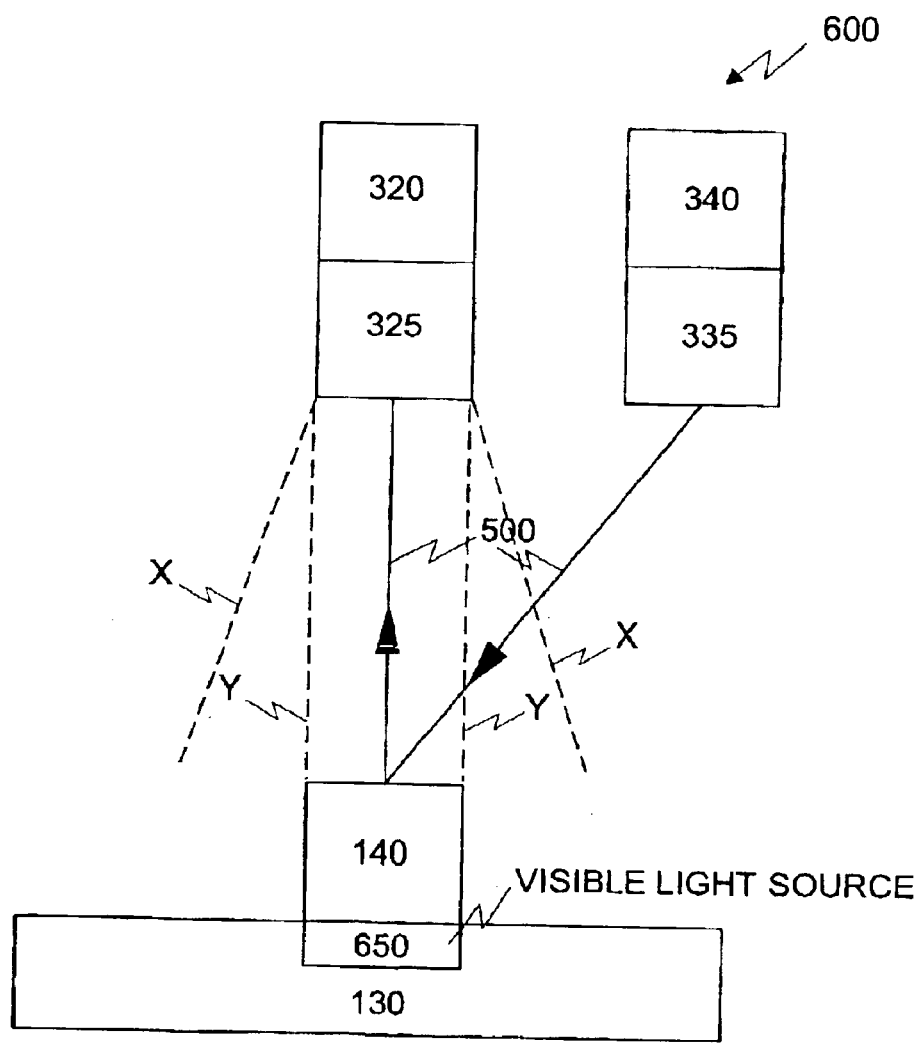
FIG. 6 is schematic diagram of the optical path of a further embodiment of the optical reader station in accordance with the present invention having a visible light radiation source.
Figure 7:
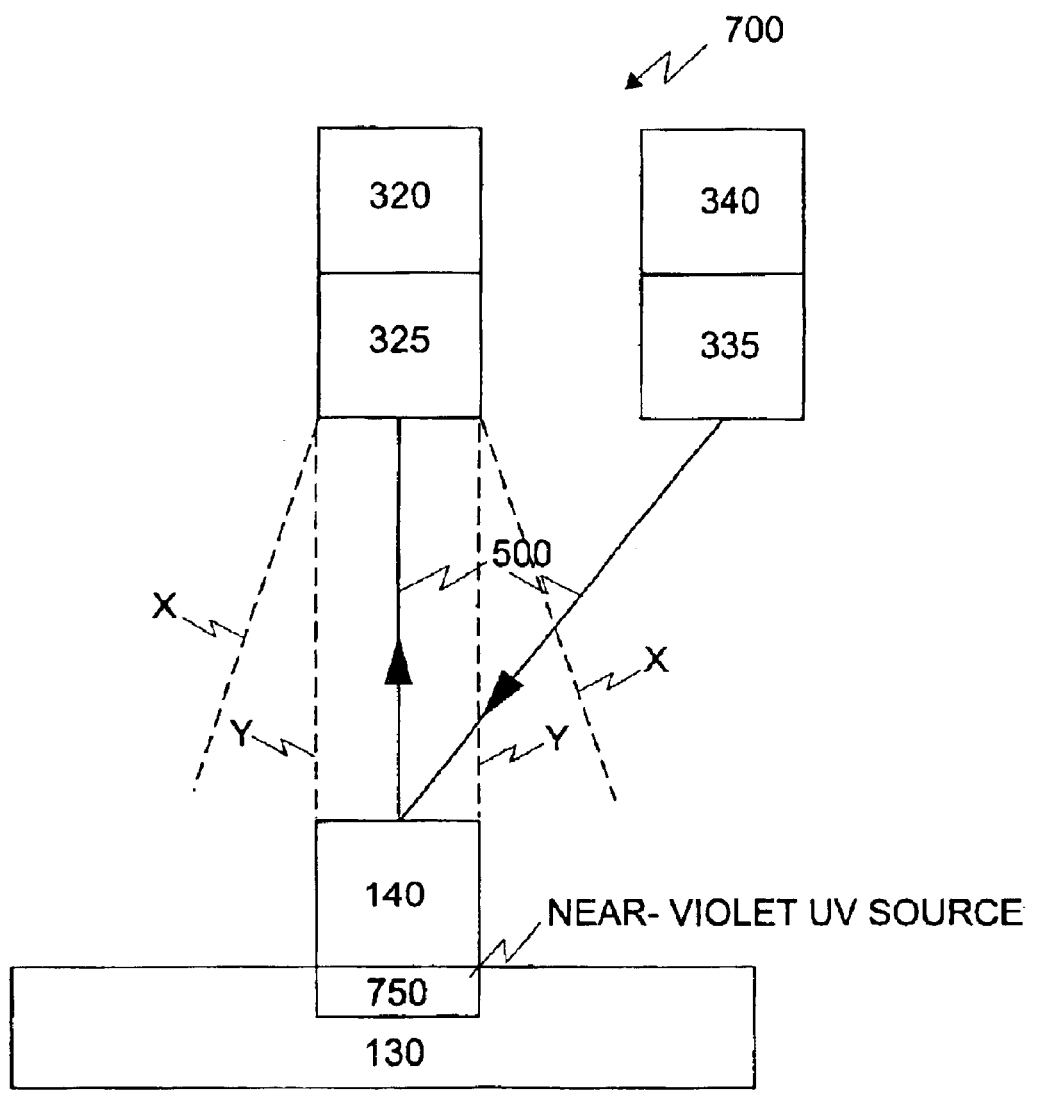
FIG. 7 is a schematic diagram of the optical path of another embodiment of the optical reader station in accordance with the present invention having a near UV light radiation source.

FIGS. 6 and 7 illustrate schematic diagram of a portion of optical reader stations 600 and 700 in accordance with the present invention, which are two alternate embodiments to the optical reader station 500. Again, the elements in the optical reader stations 600 and 700, which are similar to those in the optical reader station 100 in FIG. 4 carry the same reference numbers. Thus the portion of the optical reader stations 600, 700 shown includes a stand 130 on which may be positioned the object 140 to be read, an imager 320 with its associated optics 325 as well as an illumination source 340 and its associated optics 335. In these embodiments of the optical reader stations 600, 700, the sources of radiation 650, 750 are in the visible light range and the near-violet UV range, respectively. Virtually all imagers 325 respond well to a source in the visible light range 650, which, however, is more obtrusive then infrared, while imagers do not respond as well to the near-violet UV source 750 as they do to infrared, the radiation from the UV source 750 is less obtrusive than visible light.

Figure 8:
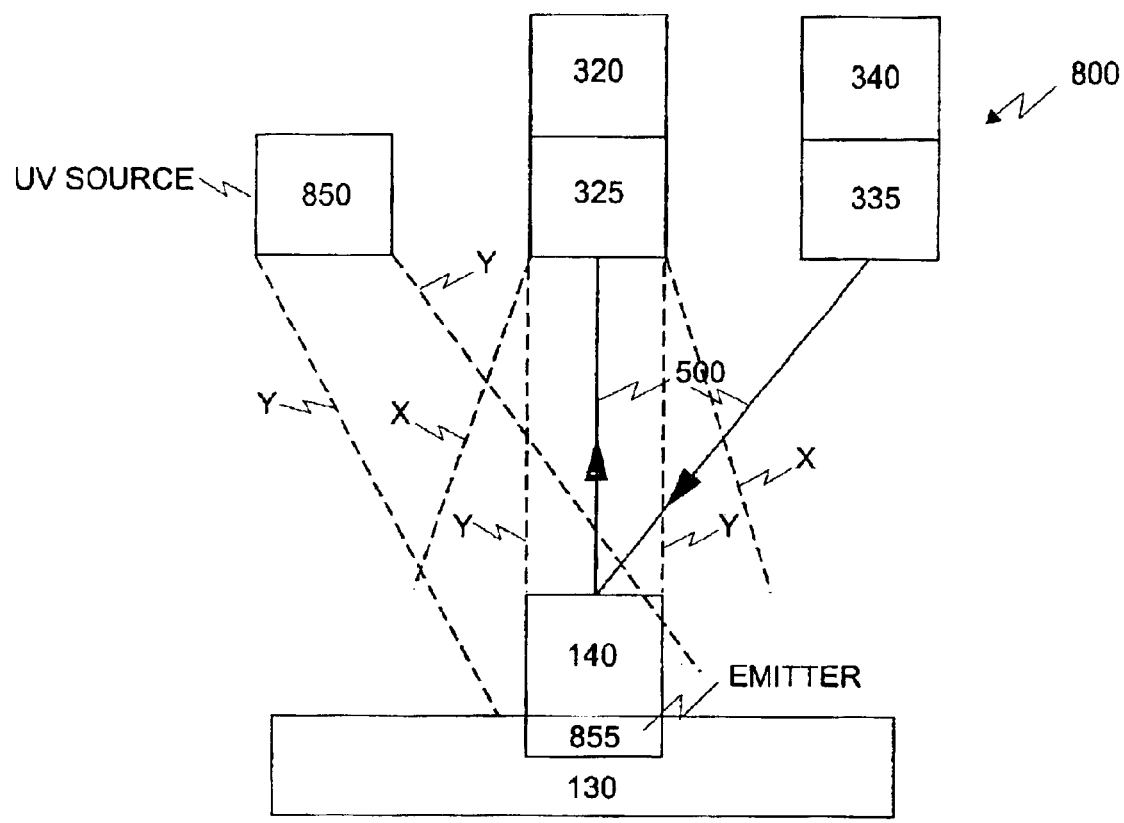
FIG. 8 is a schematic diagram of the optical path of a further embodiment of the optical reader station in accordance with the present invention having a luminescent radiation source.

In a further embodiment of the present invention illustrated in FIG. 8, which illustrates a schematic diagram of a portion of an optical reader station 800, the elements in the optical reader station 800, which are similar to those in the optical reader station 100 in FIG. 4, carry the same reference numbers. Thus the portion of the optical reader station 800 shown includes a stand 130 on which may be positioned the object 140 to be read, an imager 320 with its associated optics 325 as well as an illumination source 340 and its associated optics 335. In addition, in accordance with the present invention the optical reader station 800 includes a fluorescent or phosphorescent emitter 855 mounted in the stand 130 at the location where an object 140 to be read would be positioned. Emitter 855 is induced to luminesce by a UV source 850 of radiation, which is positioned to direct UV radiation to the emitter 855 as represented by broken lines Z. The luminescent radiation from the emitter 855 is directed to the imager 320 through the imager optics 325 and would preferably be confined to the space defined by broken lines Y, but need not be so.

As in the previous embodiments, the luminescent radiation from emitter 855 operates in conjunction with the auto-exposure control in the optical reader station 800 in the following manner. When an object 140 is not present within the object field of view as represented by broken lines X, the imager 320 will receive the radiation from the emitter 855 and the auto-exposure program will deactivate the illumination source 340. Thus illumination source 340 will remain turned off as long a nothing obstructs the emitter 855, and in this embodiment as long as nothing obstructs the UV radiation from source 850 from impinging on the emitter 855, as well. When an object 140 is placed in the object field of view, the object 140 substantially obstructs the emitter 855 radiation directed to the imager 320. This will allow the auto-exposure function to control the illumination from the source 340 to a level required to properly image the object 140. The same will occur if the UV radiation from source 850 is obstructed from impinging on the emitter 855.

Figure 9:
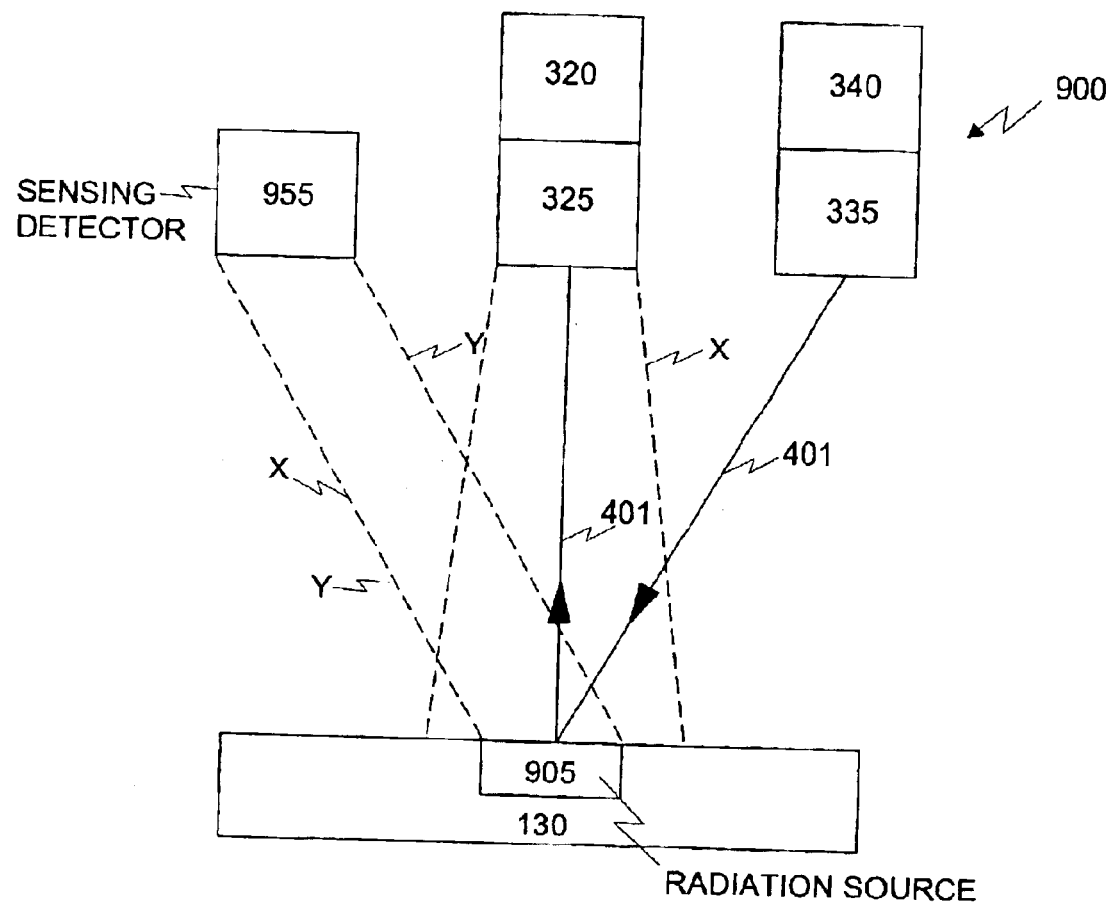
FIG. 9 is a schematic diagram of the optical path of an embodiment of the optical reader station in accordance with the present invention having a light detector.

In the embodiment of the present invention illustrated in FIG. 9, which illustrates a schematic diagram of a portion of an optical reader station 900, the elements in the optical reader station 900, which are similar to those in the optical reader station 100 in FIG. 4, carry the same reference numbers. Thus the portion of the optical reader station 900 shown includes a stand 130 on which may be positioned the object 140 to be read, an imager 320 with its associated optics 325 as well as an illumination source 340 and its associated optics 335. In addition, in accordance with the present invention the optical reader station 900 includes a source of radiation 950 mounted in the stand 130 at the location where an object 140 to be read would be positioned. The radiation source 950 may be the same as any one of the radiation sources 550, 650, 750 described with respect to FIGS. 5, 6 or 7 respectively. However, in the present embodiment, the radiation beam from the source 950 is directed to a sensing detector 955 and would preferably be confined to the space defined by broken lines Y, but need not be so. The cross-section of the radiation beam may be circular, rectangular or any other appropriate shape, however it is shaped and positioned such that, when an object 140 is placed at the appropriate position on the stand 130 for scanning, it will obscure the source 950 radiation from the sensing detector 955. The sensing detector 955 would preferably be located close to the imager 320 in the optical reader station 900.

Figure 10:
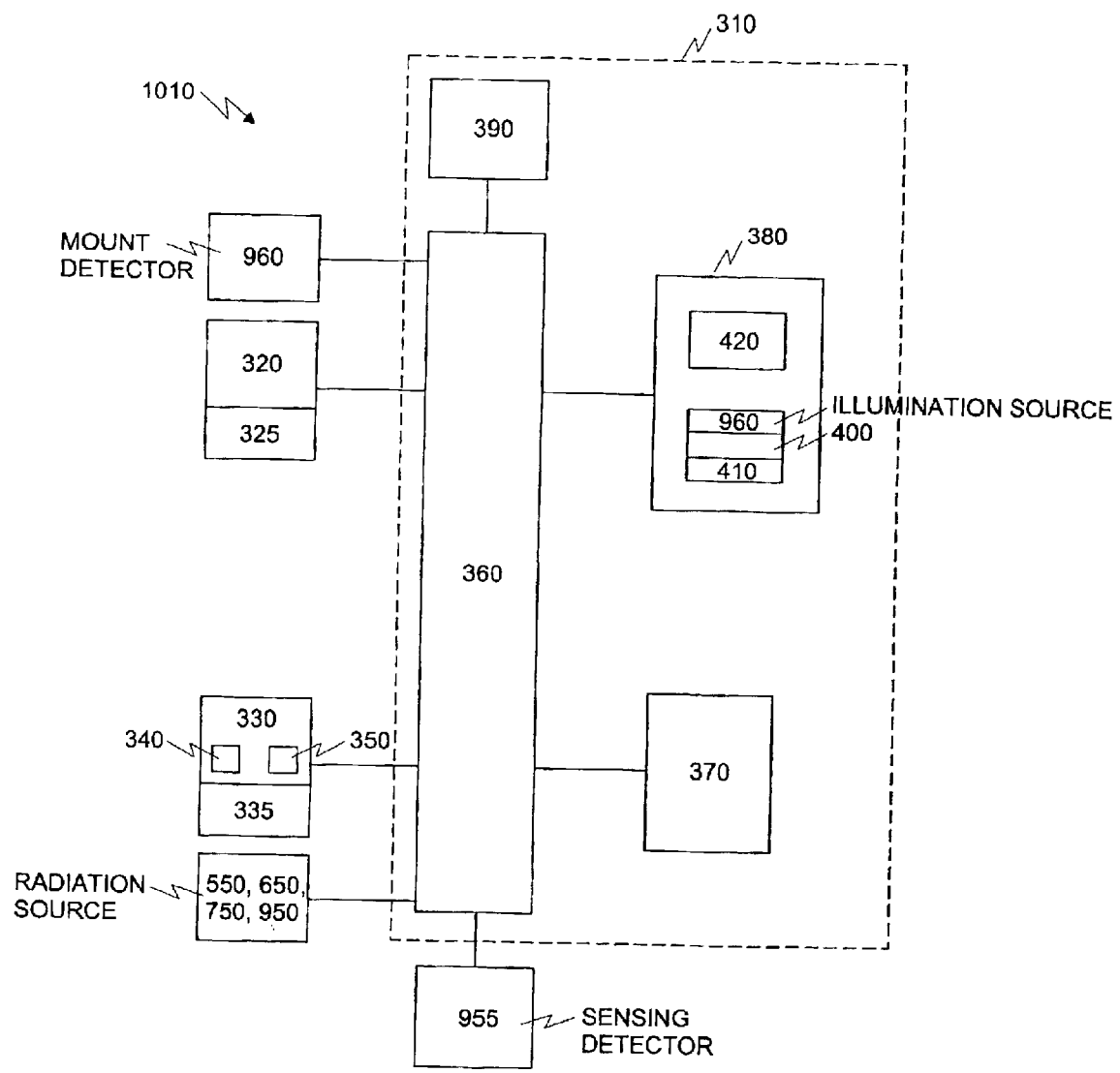
FIG. 10 is a block diagram of a optical reader station in accordance with the present invention.

The sensing detector 955 is connected to the bus 360 in the computer system 310 as illustrated in FIG. 10 such that under the control of processor 370, the illumination source 340 is turned OFF and will remain in that state as long a nothing obstructs the radiation source 950. When an object 140 is placed in the object field of view, the object 140 substantially obstructs the radiation source 950 beam and sensing detector 955 is no longer exposed to the radiation from source 950. This will cause the processor to reactivate the illumination source 340 and will allow the auto-exposure to control the illumination from the source 340 to a level required to properly image the object 140.

Modifications in accordance with the present invention made to the optical reader 110 illustrated in FIG. 3, are shown in the optical reader 1010 illustrated in FIG. 10. For clarity and to simplify the description, elements in the optical reader 1010 which are similar to those in the optical reader station 110 in FIG. 3 carry the same reference numbers. The optical reader 1010 includes a computer system 310, an imager 320, imager optics 325, incident optics 335. And incident radiation sources 330. The incident sources 330 include an illumination source 340 and may include a target source 350. The computer system 310 typically comprises a bus 360, processor 370, a memory 380, and an input/output interface 390.

In accordance with the present invention, the optical reader 1010 may include a radiation source 550, 650, 750, 850 or 950 of the type described with regard to FIG. 5 to 9 respectively, which is connected to the bus 360 in order to be activated when the optical reader 1010 is turned on. For the embodiment described with respect to FIG. 9, the sensing detector 955 is also connected to the bus 360 such that the processor 370, using the illumination source program 960, will turn the illumination source 340 OFF or ON depending on whether the sensing detector 955 does or does not receive radiation from the radiation source 950 respectively.

In addition, as seen on FIG. 10, both the illumination source 340 and the target source 350 are connected to the bus 360 and are controlled by the processor 370. In view of this, the target source 350 may also be controlled to be turned OFF at the same time as illumination source 340 in response to the sensing detector 955. Conventionally, the illumination source 340 is designed to provide sufficient radiation to properly illuminate the object 140. On the other hand target source 350 is designed to provide a relatively weak marker to assist in the placement of the object 140. Power consumption may further be minimized by combining the illumination and the target functions into one incident source 330 calibrated to a level marginally more than sufficient to illuminate an object placed on the stand 130 for optical reading. In this way the incident source 330 will operate as a target marker, in such a manner that it can be varied in intensity from a predetermined minimum, a level at which it is still visible in bright ambient light, to a predetermined maximum intensity, a level at which it illuminates the object properly when no ambient light is present.

In a further embodiment of the invention, the mount 120, shown in FIG. 1, may include a detector 960 located within it in order detect the physical presence of the optical reader 110, 1010 when attached to the mount 120. When the portable optical reader 1100, 1010 is attached to the mount 120, detector 960, which is coupled to the bus 360, provides a signal to the processor 370 to over-ride other illumination programs in order to deactivate the illumination source 340 and to activate the target source 350. In this particular embodiment, the target source 350 would be calibrated in the same manner as the incident source 330 described above, to a level marginally more than sufficient to illuminate an object 140 placed on the stand 130 of the fixed mount 120 for optical reading.

From the above embodiments, it is seen that the present invention is particularly advantageous since virtually no modifications other then some programming are required to the computer system 310, and existing functions of the optical reader are partially used to implement the invention. In addition only relatively inexpensive physical modifications such as the installation of a radiation source are required on the optical reader stations in order to implement the invention. At the same time, many advantages are reaped by minimizing the power consumption of the station, lowering component stress by shortening the operating time of certain components and by limiting the cycling rate of others, and by providing a more aesthetically acceptable station by reducing its obtrusive effects.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. An optical reader station for reading an object comprising:
    an optical reader having:
        an imager having an object field of view in which an object is to be positioned to be read; and,
        a source of illumination for illuminating the object to be read,
    a radiation source comprising a luminescence emitter activated by a UV source positioned within the object field of view and adapted to be obstructed by the object when the object is positioned to be read; and,
    a detector positioned to receive radiation from the radiation source when the radiation source is not obstructed and adapted to deactivate the illumination source when radiation is detected.

2. An optical reader station as for reading an object comprising:
    an optical reader having:
        an imager having an object field of view in which an object is to be positioned to be read; and,
        a source of illumination for illuminating the object to be read,
    a radiation source positioned within the object field of view and adapted to be obstructed by the object when the object is positioned to be read; and
    a detector positioned to receive radiation from the radiation source when the radiation source is not obstructed and adapted to deactivate the illumination source when radiation is detected wherein the detector comprises an auto-exposure control coupled to the imager for detecting the radiation and coupled to the illumination source for controlling the deactivation of the illumination source.

3. An optical reader station as claimed in claim 2 wherein the illumination source is a target source.

4. An optical reader station as claimed in claim 2 wherein the radiation source comprises an infrared source.

5. An optical reader station as claimed in claim 2 wherein the radiation source comprises a visible light source.

6. An optical reader station as claimed in claim 2 wherein the radiation source comprises a UV source.

7. An optical reader station as claimed in claim 2 wherein the radiation source comprises a luminescence emitter activated by a UV source.

8. An optical reader station for reading an object comprising:
    an optical reader having:
        an imager having an object field of view in which an object is to be positioned to be read,
        a source of illumination for illuminating the object to be read; and
        auto-exposure control means coupled to the imager to control the illumination source in response to radiation on the imager, and
    a radiation source positioned within the object field of view and adapted to be obstructed by the object when the object is positioned to be read, wherein the radiation source is adapted to direct radiation to the imager when unobstructed for deactivating the illumination source.

9. An optical reader station as claimed in claim 8, which further includes stand means for mounting the radiation source and for receiving the object to be read.

10. An optical reader station as claimed in claim 9, which further includes mount means connected to the stand means, the mount means being adapted to receive the optical reader.

11. An optical reader station as claimed in claim 10, wherein the optical reader is fixed to the mount means.

12. An optical reader station as claimed in claim 10 wherein the optical reader is detachably mounted to the mount means.

13. An optical reader station as claimed in claim 9 wherein the radiation source comprises an infrared source.

14. An optical reader station as claimed in claim 9 wherein the radiation source comprises a visible light source.

15. An optical reader station as claimed in claim 9 wherein the radiation source comprises a UV source.

16. An optical reader station as claimed in claim 9 wherein the radiation source comprises a luminescence emitter activated by a UV source.

17. An optical reader station as claimed in claim 8 wherein the illumination source is a target source.

18. An optical reader station as claimed in claim 8 wherein the illumination source includes a target source.

19. An optical reader station for reading an object comprising:
    an optical reader mount having a stand with a surface for receiving the object to be read;
    an optical reader fixed to the mount, the optical reader having:
        an imager facing the stand;
        a source of illumination for illuminating the object on the stand, and auto-exposure control means coupled to the imager to control the illumination source in response to radiation on the imager; and a radiation source mounted on the stand facing the imager for directing radiation to the imager, whereby the source of illumination is adapted to be deactivated by the auto-exposure control means when the imager receives radiation from the radiation source.

20. An optical reader station as claimed in claim 19 wherein the optical reader is detachably fixed to the mount.

21. An optical reader station as claimed in claim 19 wherein the radiation source is mounted within the surface of the stand.

22. An optical reader station as claimed in claim 19 wherein the radiation source comprises an infrared source.

23. An optical reader station as claimed in claim 19 wherein the radiation source comprises a visible light source.

24. An optical reader station as claimed in claim 19 wherein the radiation source comprises a UV source.

25. An optical reader station as claimed in claim 19 wherein the radiation source comprises a luminescence emitter activated by a UV source.

26. An optical reader station as claimed in claim 19 wherein the illumination source is a target source.

27. An optical reader station as claimed in claim 19 wherein the illumination source includes a target source.

* * * * *

UNITED STATES PATENT AND TRADEMARK OFFICE
CERTIFICATE OF CORRECTION

PATENT NO. : 6,880,759 B2 Page 1 of 1
APPLICATION NO. : 10/444406
DATED : April 19, 2005
INVENTOR(S) : Christopher D. Wilde et al.

It is certified that error appears in the above-identified patent and that said Letters Patent is hereby corrected as shown below:

Claim 1, column 9 lines 40-54, please delete "An optical reader station.........radiation is detected."

Claim 2, column 9 line 55, please delete "as".

Signed and Sealed this

Sixth Day of March, 2007

JON W. DUDAS
*Director of the United States Patent and Trademark Office*